United States Patent [19]

Phillips et al.

[11] Patent Number: 5,682,507
[45] Date of Patent: Oct. 28, 1997

[54] PLURALITY OF SERVERS HAVING IDENTICAL CUSTOMER INFORMATION CONTROL PROCEDURE FUNCTIONS USING TEMPORARY STORAGE FILE OF A PREDETERMINED SERVER FOR CENTRALLY STORING TEMPORARY DATA RECORDS

[75] Inventors: Mark Phillips, Campbell; John S. de Roo; Andreas E. Hotea, both of Santa Clara, all of Calif.; Robert W. Redd, Roswell, Ga.

[73] Assignee: Tandem Computers, Incorporated, Cupertino, Calif.

[21] Appl. No.: 478,057

[22] Filed: Jun. 7, 1995

[51] Int. Cl.$^6$ .................................................. A06F 13/00
[52] U.S. Cl. ........................ 395/200.08; 395/200.03; 395/474
[58] Field of Search ............................. 395/850, 500, 395/200.01, 600, 876, 451, 750, 201, 200.08, 200.03, 474

[56] References Cited

U.S. PATENT DOCUMENTS

| | | | |
|---|---|---|---|
| 4,817,091 | 3/1989 | Katzman et al. | 395/182.06 |
| 4,949,248 | 8/1990 | Caro | 395/500 |
| 5,095,421 | 3/1992 | Freund | 395/671 |
| 5,247,670 | 9/1993 | Matsunaga | 395/650 |
| 5,278,984 | 1/1994 | Batchelor | 395/650 |
| 5,349,657 | 9/1994 | Lee | 395/650 |
| 5,392,400 | 2/1995 | Berkowitz et al. | 395/200.01 |
| 5,434,994 | 7/1995 | Shaheen et al. | 395/500 |
| 5,457,797 | 10/1995 | Butterworth et al. | 395/650 |
| 5,504,894 | 4/1996 | Ferguson et al. | 395/650 |
| 5,553,285 | 9/1996 | Krakauer et al. | 395/600 |

FOREIGN PATENT DOCUMENTS

| | | |
|---|---|---|
| 0278 312 A2 | 8/1988 | European Pat. Off. . |
| 0278 312 A3 | 8/1988 | European Pat. Off. . |
| 0428 006 A2 | 5/1991 | European Pat. Off. . |
| 0518 639 A2 | 6/1992 | European Pat. Off. . |
| 0518 639 A3 | 12/1992 | European Pat. Off. . |
| 96 30 3661 | 9/1996 | European Pat. Off. . |

*Primary Examiner*—Thomas C. Lee
*Assistant Examiner*—Le Hien Lua
*Attorney, Agent, or Firm*—Gary S. Williams; Flehr Hohbach Test Albritton & Herbert LLP

[57] ABSTRACT

The present invention is a distributed computer system having a plurality of end user terminals and a plurality of loosely coupled server computers that share no resources with each other. A multiplicity of user application processes are distributed over the server computers. A temporary storage file is stored on a first one of the server computers, for temporarily storing queues of data records. Each user application process responds to execution of a WriteQ TS instruction specifying data to be stored in a specified temporary storage queue by generating and storing at least one TS data record in the temporary storage file representing the specified data. Each TS data record has a primary key indicating the record's position in the specified temporary storage queue. Each TS data record is stored in the same temporary storage file on the first server computer regardless of which server computer executes the WriteQ TS instruction. Each user application process also responds to execution of a ReadQ TS instruction specifying a temporary storage queue from which data is to be retrieved, by reading at least one TS data record from the temporary storage file.

6 Claims, 8 Drawing Sheets

PLURALITY OF SERVERS HAVING IDENTICAL CUSTOMER INFORMATION CONTROL PROCEDURE FUNCTIONS USING TEMPORARY STORAGE FILE OF A PREDETERMINED SERVER FOR CENTRALLY STORING TEMPORARY DATA RECORDS

The present invention relates generally to computer systems used for customer information control system (CICS) transaction processing, and particularly to a distributed computer system that distributes the computational load of a customer information control system over a set of loosely coupled parallel processors and that provides an application program interface (API) having transaction serialization control functions.

BACKGROUND OF THE INVENTION

The prevalent model for large scale customer information control systems is a single mainframe computer. Large numbers of transactions are accommodated by using multiple user application processes running on the single mainframe, but in distinct address spaces. When two transactions running in such a system need to share context information, both transactions are executed in the same address space (i.e., by the same user application process) and the context information that needs to be shared is stored in "shared memory" within the common address space.

To help ensure that a transaction is executed by the same user application process that is used to execute any other transaction with which it may need to share context information, it has been necessary to determine, prior to execution of the transaction, the "transactional affinity" of the transaction with all other transactions executing on the customer information control system. The procedure for determining transactional affinity is complex, must be made before the intiation of transaction execution, and can cause the allocation of a transaction to a heavily loaded user application process while other user application processes are loaded much more lightly.

Examples of customer information control system API functions that can create inter-transaction affinities in the aforementioned prevalent model are the CICS WriteQ TS and CICS ReadQ TS functions for storing and retrieving data from temporary storage queues. When two or more distinct transactions use the same temporary storage queue, the prevalent model requires that all such transactions be executed in the same address space. In other words, if transactions T1 and T2 both perform CICS WriteQ TS and/or ReadQ TS functions on the "Q1" temporary storage queue, then both must be executed in the same address space (i.e., by the same user application process) in the prevalent model.

It is a primary object of the present invention to provide a customer information control system in which transactions are assigned to application processes based on available processor resources (i.e., based on load balancing considerations), without regard to the potential or known need of the transactions to share context.

It is a related object of the present invention to provide a customer information control system in which transactions that include CICS WriteQ TS and CICS ReadQ TS function calls are assigned to application processes based on available processor resources (i.e., based on load balancing considerations) and do not need to be executed in the same address space, and furthermore do not need to be executed by the same server processor.

SUMMARY OF THE INVENTION

In summary, the present invention is a distributed computer system having a plurality of end user terminals and a plurality of loosely coupled server computers that share no resources with each other. A multiplicity of user application processes are distributed over the server computers.

A temporary storage file is stored on a first one of the server computers, for temporarily storing queues of data records. Each user application process responds to execution of a WriteQ TS instruction specifying data to be stored in a specified temporary storage queue by generating and storing at least one TS data record in the temporary storage queue file representing the specified data. Each TS data record has a primary key indicating the record's position in the specified temporary storage queue. Each TS data record is stored in the same temporary storage file on the first server computer regardless of which server computer executes the WriteQ TS instruction.

Each user application process also responds to execution of a ReadQ TS instruction specifying a temporary storage queue from which data is to be retrieved, by reading at least one TS data record from the temporary storage file.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
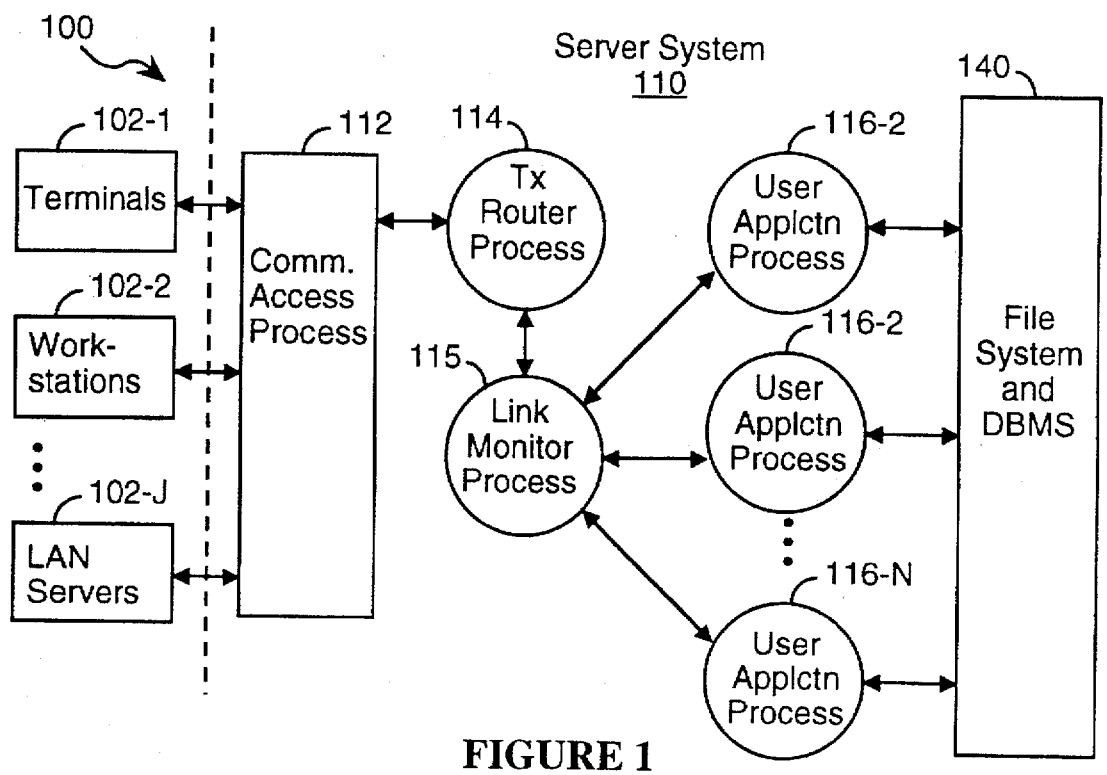
FIG. 1 is a block diagram of a customer information control system in accordance with a preferred embodiment of the present invention.

Referring to FIG. 1, there is shown a distributed computer system 100 configured to operate as a customer information control system. End user terminals 102 send and receive data to the server system 110 via a communications management process 112. The communications management process 112 includes communication access procedures for routing data messages between the terminals and a transaction router process 114. The communication procedures in the preferred embodiment utilize a version of the SNA access methods licensed by Tandem under the trade mark SNAX. In the preferred embodiment the transaction router process 114 resides on and is executed by a single one of the servers 120 (see FIG. 2).

For the purposes of this document, a transaction is defined to be a logical unit of work, performed by the execution of an application program that can include a number of function and/or subroutine calls to transaction processing facilities via an established application program interface (API). In the preferred embodiment, for each distinct type of defined transaction there is a corresponding application program that is executed to perform that transaction, as is discussed in more detail below with reference to FIG. 3.

The transaction router process 114, based on information in the data received from the end user terminals, determines what transactions are to be executed in order to respond to the messages from the end user terminals. More specifically, the transaction router process creates and maintains one thread of execution for each terminal 102 in which it is in communication. The thread of execution associated with each terminal undertakes to save the context associated with its corresponding terminal (i.e., of transactions that are being performed and that are waiting to be performed) for fault recovery purposes. Each thread of execution is programmed to enable execution of only one transaction at any one time for its associated terminal. When a transaction is requested for a terminal for which another transaction is already executing, execution of the requested transaction is delayed until the other transaction completes.

The transaction router process 114 also determines what "server class" each requested transaction should be mapped to (as will be explained in more detail below), and initiates the execution of transactions that are ready to be started by forwarding a corresponding transaction record to the link manager process 115. The link manager 115 selects user application processes 116 to execute those transactions. An explanation of how transactions (which include requests to execute transactions) are allocated or assigned to user application processes is provided below respect to FIGS. 3 and 4.

Figure 2:
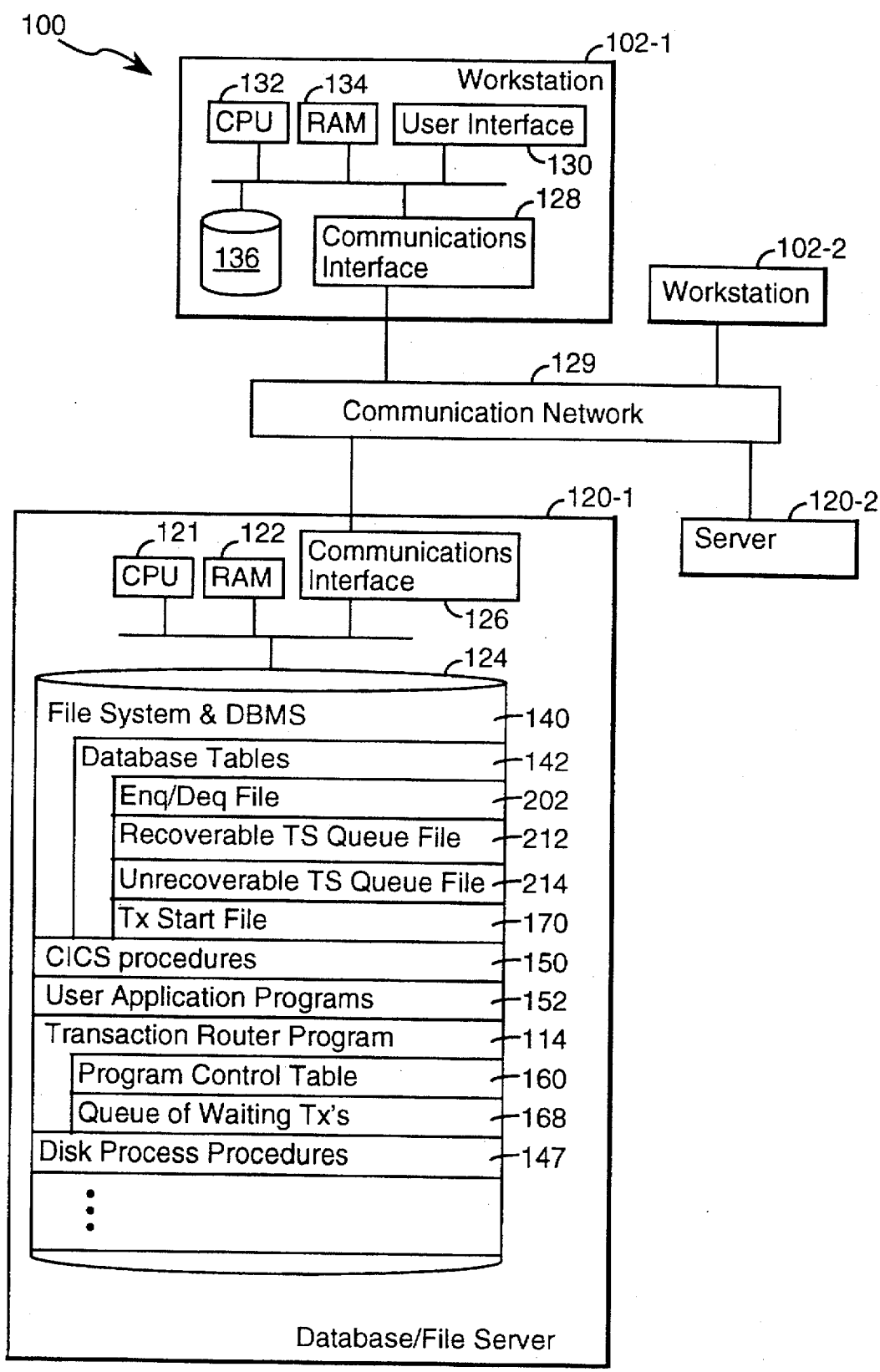
FIG. 2 is a block diagram of multiple workstations and server computers in a customer information control system in accordance with a preferred embodiment of the present invention.

The user application processes 116 are distributed over a plurality of servers. Referring to FIG. 2, each server 120 is a separate processor with its own CPU 121, primary memory 122 (i.e., fast random access memory) and secondary memory 124 (typically disk storage), and other resources. The servers in the preferred embodiment are loosely coupled "shared nothing" processors that share no resources other than data links, and whose basic operations are controlled by a message based operating system, which in the preferred embodiment is the Tandem message based operating system. The "loose coupling" between the server processors is due to the lack of shared resources, and the use of a message based operating system to integrate the multiple server processors into a single system. While in the preferred embodiment the server processors are interconnected by high speed data links, in alternate embodiments the server processors can be interconnected by either local area network or wide area network connections.

The servers 120 and terminals 102 communicate with one another via communications interfaces 126, 128 and a communication network 129. The terminals 102 are client systems and can be a mix of simple, dumb terminals with just a communications interface 128 and user interface 130, full workstations with their own CPU 132, primary memory 134 and secondary memory 136, and other server computers (servers).

Systems using the message based operating system include a distributed file and database management system (DBMS), hereinafter called the file system 140, in which database tables 142 can be stored on any node in the system and can be partitioned so that various portions of a table are stored on multiple nodes.

Access to file system tables is performed by user application processes 116 and system level processes, without regard to the location of the files and table partitions, by subroutine and function calls to the file system 140, which in turn makes calls to disk processes 146 (see FIGS. 5, 6) that handle all access to file system tables and files. In the preferred embodiment, when a call is made to the file system 140 to access a specified record in a table, the file system determines from a database catalog and/or other resources the location of the file to be accessed. It then sends access request messages to the associated disk process on the server on which the file is located, which executes corresponding disk process procedures 147 to perform the requested file or table access task. If the physical file and disk process are on the same server computer as the process requesting access, the messages are sent from one process to another within the server. Otherwise, the messages are sent from one server to another. From the perspective of the user or system process requesting access to a table or file, there is no distinction between files stored locally and remotely insofar as the procedures calls made to initiate the access.

Each server 120 also includes a set of customer information control system (CICS) procedures 150, including application program interface (API) procedures for receiving and processing standardized CICS procedure calls. Each server also includes a set of application programs 152 which are executed in response to data messages from the end user terminals 102 to perform the transactions specified by those data messages. The application programs 152, in turn, include embedded calls to the CICS procedures 150.

Figure 3:
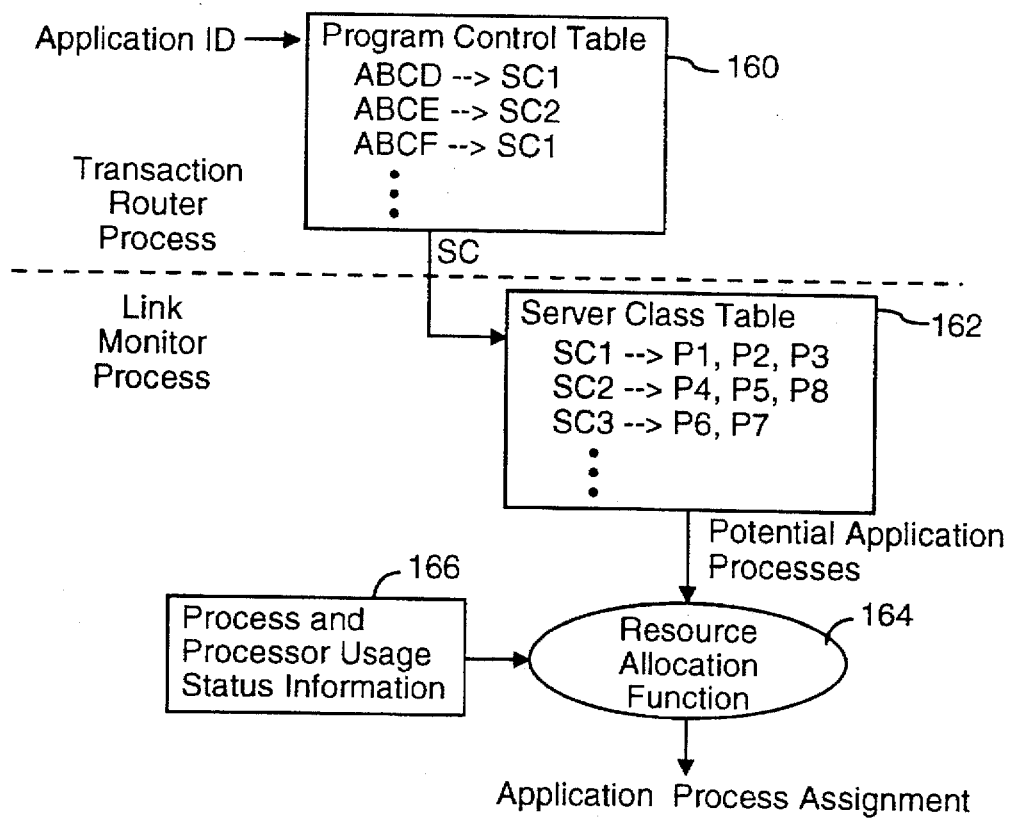
FIG. 3 is a block diagram of the user application process assignment procedure used by the link manager process in a preferred embodiment of the present invention.

Referring to FIG. 3, a program control table 160 maps transaction IDs to server classes. Each server class, in turn, is mapped by a server class table 162 to a set of user application processes that can execute all the application programs for that server class. Thus, a server class represents multiple instances of a user application process that has access to a set of procedures for executing a particular set of application programs. In general, the user application processes in each server class have different attributes than the user application processes in other server classes. The program control table 160 and server class table 162 are simply a way of storing information indicating what user application processes are appropriate candidates for executing any specified application program. More than one application program may be mapped to the same server class, so long as all the user application processes associated with that server class have access to the procedures for executing all the application programs assigned to that server class.

Execution of a transaction (i.e., the corresponding application program) in response to a request from an end user terminal 102 (or in response to a CICS Start command from another transaction, as described below) is assigned by the transaction router process 114 and link manager process 115 to a particular user application process as follows. The transaction request received by the transaction router process 114 includes a transaction ID. The transaction router process 114 looks up the transaction ID in the program control table 160 to select the server class for that transaction ID, and passes a transaction record with the transaction ID and a value representing the selected server class to the link manager process 115.

The link manager process 115 determines the set of potential user application processes for executing a requested transaction by looking up the record in the server class table 162 corresponding to the server class specified in the received transaction record. Then, using a resource allocation function 164, it selects one user application process from the set of potential user application processes in the specified user class. The resource allocation function 164 receives information 166 indicating (A) which user application processes are busy, and (B) the overall load on each server. A list of busy user application processes is generated by the link manager 115, since it is the process that allocates user allocation processes in the first place. The overall load on each server is obtained using load monitoring techniques well known to those skilled in the art.

The resource allocation function 164 first selects from the set of potential user application processes for executing a particular transaction those potential user application processes that are not currently busy. From the set of not busy user application processes, if any, the overall loads on the associated servers are compared and a user application process on a non-busy one of those servers is selected as the assigned user application process for the pending transaction request. If all the potential user application processes are busy, then the pending end user request is put on a queue 169 of transactions waiting to execute (see FIG. 4).

Failure of a single user application process will generally not damage or impeded the work done by other application processes in the same server class. In the preferred embodiment, each server class has multiple instances of the same user application process. Therefore after the failure of a user application process in a particular service class, the link manager 115 assigns transactions requiring execution by a user application process in that server class to other instances of the user application process in that same server class. As a result, performance of the customer information control system 100 of the present invention tends to degrade very gradually a small number of user application processes fail. To provide fault tolerance against processor failures, the user application processes in each server class are preferably distributed over all the server computers in the system. In addition, other fault tolerance methodologies known to those skilled in the art are used to ensure quick restarting of failed processes on either the same or a different server computer than the computer on which the failed processes initially resided.

In an alternate embodiment, the functions of the transaction router process 14 and link manager process 115 could be performed a single "router process". In the preferred embodiment, these two processes work together to route transaction execution requests to appropriate user application processes.

When the transaction or computational load on a distributed computer system in accordance with the present invention rises to the point that transaction completion and response times become unacceptable, the computational capacity of the system is expanded simply by adding one or more additional servers 120 to the system and adjusting the server class table 162 (FIG. 3) to include user application processes on the new server(s). In other words, the distributed computer system 100 of the present invention is scaleable in that almost any level of transactions can be accommodated by providing a corresponding number of servers with sufficient computational resources to handle that level of transactions.

Transaction Start Control

Figure 4:
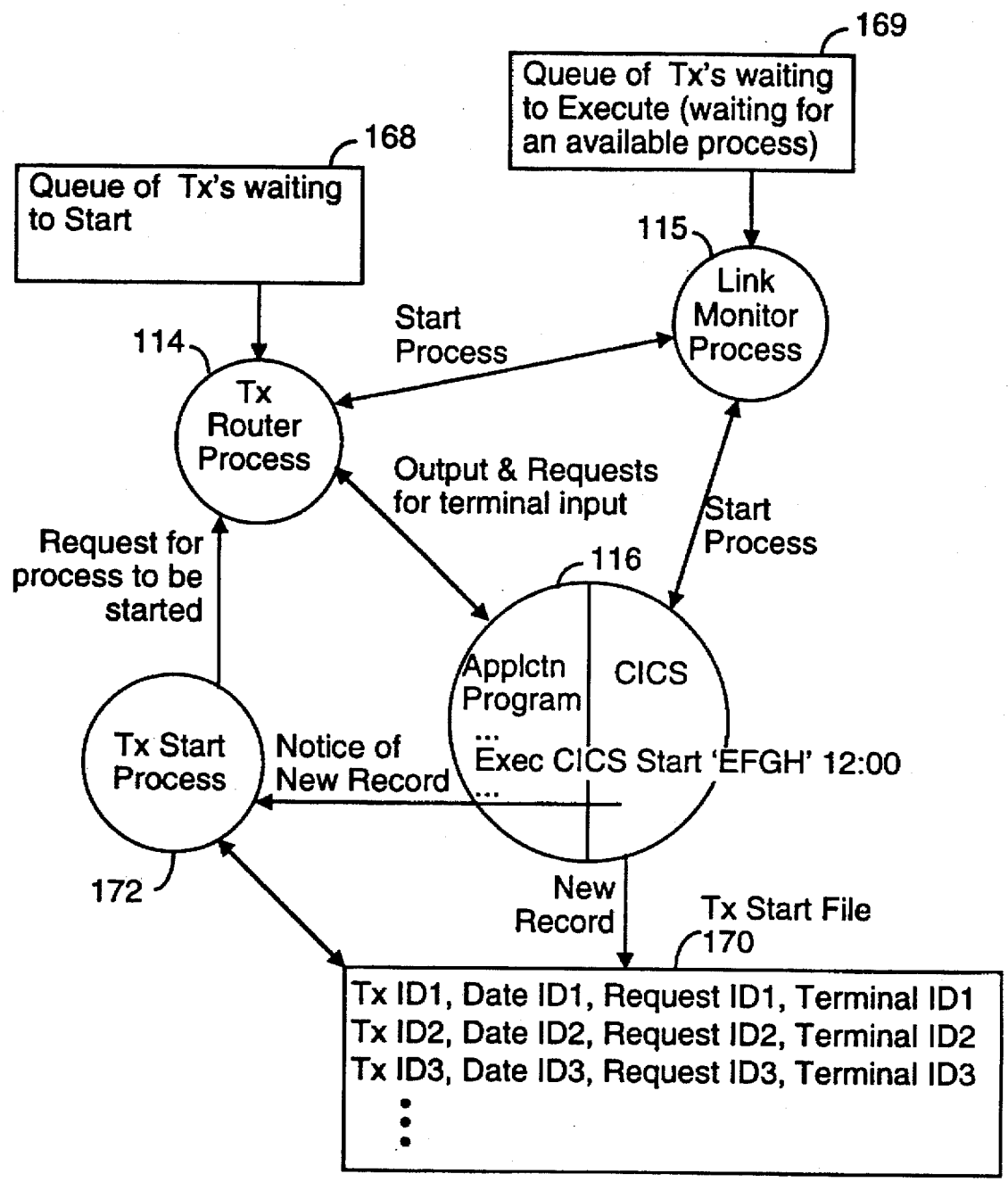
FIG. 4 is a control flow diagram of the processes used to start execution of transactions in a preferred embodiment of the present invention.

FIG. 4 is a conceptual representation of the processes involved in starting execution of waiting transactions, and the data structures used to keep track of waiting and quiescent transactions. "Waiting to start" queue 168 is a queue of transactions that are waiting to start because another transaction having the same associated terminal ID is already executing.

When a transaction request is received from an end user terminal, or from the transaction start process 172 (as explained below), the associated transaction is put on the queue 168 by the transaction router process 114 only if another transaction for the same terminal is already executing (i.e., the system executes only one transaction per terminal at any one time). Otherwise, the transaction router process 114 initiates execution of the received transaction by forwarding a corresponding transaction record to the link manager 115.

Each time that execution of a transaction is completed, the transaction router process 114 reviews the transaction records in the "waiting to start" queue 168 for transactions that have the same terminal ID as the just completed transaction. If there are one or more such waiting transactions represented by transaction records in the queue 168, the transaction router process 114 selects one of those waiting transactions based on transaction ordering criteria using techniques known to those skilled in the art. The transaction router process then initiates the execution of the selected transaction by forwarding the corresponding transaction record to the link manager 115, and deletes that transaction record from the "waiting to start" queue 168.

The link manager process 115 receives transaction records sent to it by the transaction router process. As explained above with reference to FIG. 3, the link manager process 115 determines the set of potential user application processes for executing a requested transaction by looking up the record in the Server Class Table 162 corresponding to the server class specified in the received transaction record. It then selects from the set of potential user application processes for executing a particular transaction those potential user application processes that are not currently busy. From the set of not busy user application processes, if any, the overall loads on the associated servers are compared and a user application process on a non-busy one of those servers is selected as the assigned user application process for the pending transaction request. If all the potential user application processes are busy, then the pending end user request is put on a queue 169 of transactions waiting to execute (see FIG. 4).

Every time that execution of a transaction is completed, making a user application process available for assignment to another transaction request, the link manager process 115 reviews the waiting transaction records in the queue 169 for transactions that can be assigned to the user application process that just completed execution of a transaction. That is, it looks through the queue 169 for applications assigned to the server class associated with the user application process that has become available. The link manager process 115 then selects one of the transactions (if any) matching the server class of the available user application process, and initiates execution of the selected transaction by forwarding the corresponding transaction record to the available user application process.

Referring now to the lower half of FIG. 4, executing transactions can initiate other transactions through the use of the CICS Start command. Whenever the CICS Start command is executed, a corresponding record is stored in a globally accessible transaction start File 170. In other words, the CICS Start procedure calls the disk process associated with that file, and thereby causes a record to be added to the Transaction Start file 170. Each record in the transaction start file 170 contains a transaction ID, a date ID, a request ID, and a terminal ID. The transaction ID identifies the application to be executed, the date ID indicates the earliest time and date at which the associated transaction should be started, and the request ID identifies the requesting transaction. The terminal ID identifies the terminal associated with the requested transaction. While the terminal ID for the requested transaction is usually the same as for the requesting transaction, it is possible for a transaction executing a CICS Start command to specify a different terminal ID than its own (e.g., when the results of the transaction are to be sent to a specified terminal other than the requesting transaction's terminal). The request ID ensures that each transaction start record is unique, and is needed to ensure that each "cancel transaction" command cancels only transactions associated with a specified requestor.

A single, globally accessible transaction start file 170 is provided for the entire system 100, and the execution of a CICS Start command by a transaction creates a transaction start record in the same transaction start file 170, regardless of which user application process and server computer are used to execute the CICS Start command. The transaction start file 170 is a table with a primary index based on the date ID, and thus access to the transaction start records is in date and time order, with the records having the earliest date and time being accessed before those with later dates and times.

The Transaction Start File 170 is monitored by a process called the Transaction Start Process 172. In particular, during normal operation the transaction start process 172 processes all transaction start records having start times at or before the current time. Each such transaction start record is processed by sending a "start request" to the transaction router process 114 and by deleting the transaction start record from the transaction start file 170. The start request sent to the transaction router process 114 is a request that a specified transaction be performed for a specified terminal, as represented by the transaction ID and terminal ID values in the start request message. Upon processing all the transaction start records having start times at or before the current time, the transaction start process 172 determines the earliest date and time associated with the remaining records, if any, in the transaction start file 170, and then executes a "wait" or "sleep" command that puts itself to sleep until that date and time.

Each time an application performs a CICS Start command and thereby adds a new record to the transaction start file 170, a notification message is also sent to the transaction start process 172, causing the transaction start process to wake up and re-evaluate the transaction start file 170. In particular, a CICS Start command may request that a transaction be started immediately simply by indicating a start time at or before the current time. When the transaction start process 172 is woken up by a new record notice, it performs its standard procedure, and thus determines whether any transaction start records in the transaction start file 170 have specified start times at or before the current time. The processing of such transaction start records and the subsequent return of the transaction start process to the sleep state are described above.

When an executing transaction performs a CICS Cancel command, a "delete record" command is sent to the disk process associated with the transaction start file 170. The cancel command must include the transaction ID and the request ID of the associated transaction start record. If a matching record is found in the transaction start file 170, it is deleted by the disk process, thereby canceling the transaction start request. Any transaction, not just the one to initiate a transaction start, can cancel a pending transaction start so long as it knows both the transaction ID and request ID of the associated transaction start record. Furthermore, the transaction that cancels a pending transaction (via a CICS Cancel command) can be executed in a different user application process and on a different server than the user application process and server that executed the transaction that initiated that pending transaction (via a CICS Start command).

Since all scheduled transaction starts initiated by transactions executing in all user application processes on all servers are handled by a single transaction start process 172, the system of the present invention can guarantee that transaction requests with ordered start time values are started in their designated order.

For example, consider the operation of the transaction start process 172 if a transaction (or a set of transactions) execute CICS Start commands so as to create two or more transaction start records in the transaction start file 170 with start times that are separated from each other by, say, 1 second. When the time associated with the first of those transactions is reached, the transaction start process 172 will awaken, send a corresponding transaction request to the transaction router process 114, and then put itself back to sleep for about a second until the time associated with the next of those transactions. When the time associated with the second of those transaction is reached, the transaction start process will awaken, send a transaction request corresponding to the second transaction start record to the transaction router process, and then put itself back to sleep until the time associated with the next of those transactions, if any.

In summary, the transaction requestor process 114, link manager 115 and the transaction start process 172 provide transaction start and application process allocation services to end users on a server independent basis.

Serialization Control

Parallel applications are those which either are executed during overlapping time periods, or which can execute at different times but which have an associated serialization requirement. The CICS Enq and CICS Deq functions are used for synchronizing transactions with the availability of a specified resource. These "serialization functions" are used by transactions to ensure that certain transactions are executed one at a time, or to ensure that certain transactions are executed in a specific order, even if there is no direct link or communication path between those transactions.

Figure 5:
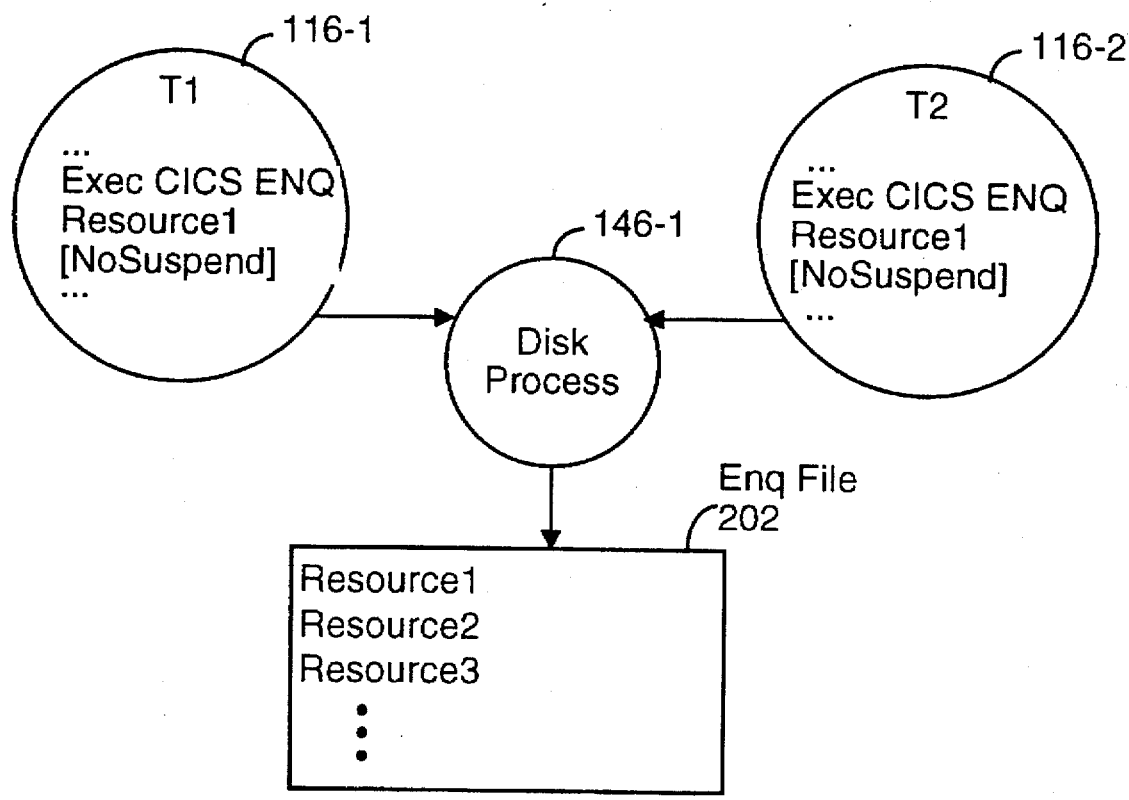
FIG. 5 is a block diagram of the system resources associated with use of a global Enqueue/Dequeue function for serializing execution of transactions in a preferred embodiment of the present invention.

Referring to FIG. 5, in the present invention, the CICS Enq function is performed as follows. Each application executed by a user application process can execute the CICS Enq function, naming a system resource or an arbitrary name. The Enq function sends a message to the disk process 146-1 associated with an Enq file 202. A single, globally accessible Enq file 202 is provided for the entire system 100 (see FIG. 2), and all "names", including resource names, used in Enq and Deq function calls are "global" names in that an Enq on a specified name will block the progress of any other application process that attempts to call the Enq function using that same name, regardless of the server on which that application process is executed.

When an Enq function call is executed, the disk process 146-1 first checks to see if the Enq file 202 contains an Enq record for the same name or resource. When the Enq name is a data area resource, and a length value is included in the initial Enq function call, subsequent calls to the Enq function that name a data area resource require a comparison of the entire resource range in the Enq record with the entire range of the new Enq function call to determine whether there is any overlap. If there is any overlap, and the NoSuspend option has not been used, then the process making the subsequent Enq function call is suspended.

More generally, if the name or resource named in an Enq function call matches or overlaps with the name or resource in an existing Enq record. If such an Enq record is found, and the NoSuspend option has not been specified in the Enq function call, then the process making the Enq function call is suspended. If the process making the Enq function call has specified the NoSuspend option, the calling process is not suspended, but an EnqBusy flag is passed back to the calling process as a return parameter so that the transaction being executed by the calling process can detect the fact that the resource associated with the End function call is unavailable and can handle the resource unavailability without waiting for the resource to become available.

If the name or resource in the Enq function call does not match or overlap with the name or resource listed in any existing Enq record, a new Enq record is created and stored in the Enq file 202 by the disk process 146-1.

An Enq record can be made to automatically expire by specifying in the Enq function call a maximum duration value (MaxLifetime).

Most commonly, an Enq record is explicitly deleted through the use of a CICS Deq function call. When an application has completed use of the resource associated with an earlier Enq function call, the Deq function is called by the application. Similarly, when a transaction causes the creation of an Enq record that uses an Enq name not associated with a resource, such as a name used for explicit serialization of two or more applications, that transaction will call the CICS Deq function when its is ready to release the serialization lock associated with the Enq name. The call to the CICS Deq function generates a call to the disk process 146-1 for the Enq file 202, which in turn deletes the associated Enq record in the Enq file 202, if one exists. In addition, after the Enq record is deleted, execution is resumed for any user application process that was suspended when it attempted to execute an Enq instruction on the same specific resource. The first instruction executed by the revived user application process will be the CICS Enq function call that caused the user application to be suspended. If more than one user application process was suspended on the same Enq record, then the first of those user application processes to execute the CICS Enq function will be revived, and the others will be re-suspended until the Enq record is once again deleted.

Note that any process can request deletion of an Enq record, not just the process that caused its creation, by calling the CICS Deq function with the corresponding resource or Enq name. However, during normal use it is expected that only the transaction responsible for creation of an Enq record will call the Deq function to cause deletion of that Enq record.

In summary, each record of the Enq file 202 is similar to a mutex, in that each Enq record can be used to serialize execution of two or more processes. A typical application of the Enq function is to prevent more than one process from using a particular resource at any one time. In the present invention, the processes which are making serialized use of a resource or which are otherwise serializing their operation need not be executed on the same server. Rather, the Enq function is implemented as a global function such that any two processes which execute Enq function calls using the same name in the Enq function call will be serialized, regardless of their respective execution locations in the system. That is, the second of the two processes that attempts to make the Enq function call will be suspended until the first of the two processes to make the Enq function releases the second process by making a Deq function call, or through automatic expiration of the associated Enq record.

Temporary Storage Queues

Figure 6:
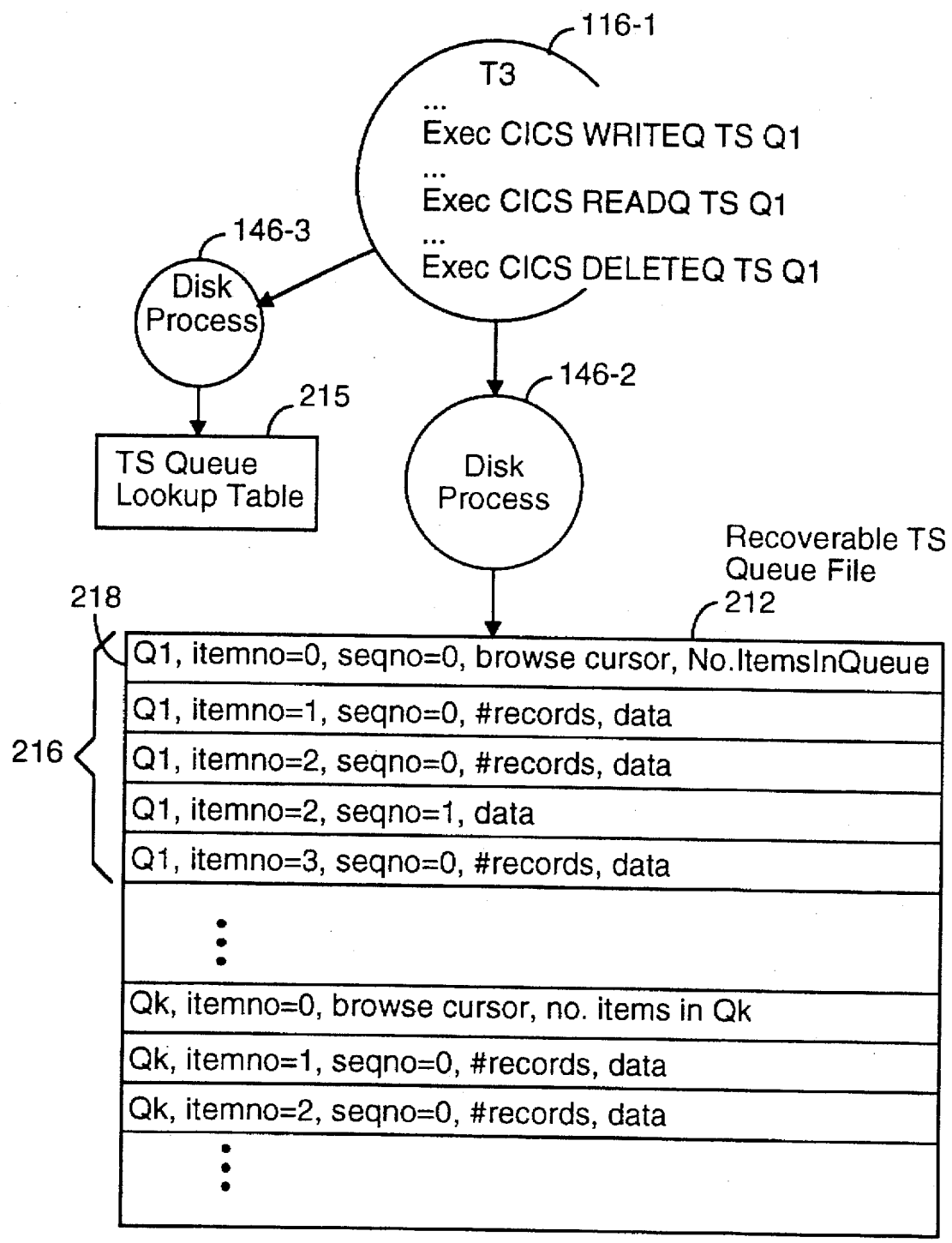
FIG. 6 is a block diagram of the system resources associated with use of a global temporary storage queue, suitable for sharing data between transactions executed by distinct user application processes on the same or different servers, in a preferred embodiment of the present invention.

Referring to FIG. 6, temporary storage queues are a mechanism for temporarily storing data, and for transferring data between applications running in separate user application processes having separate address spaces. In the preferred embodiment, two globally accessible files 212, 214 (see FIG. 2) are used to store all temporary storage (TS) queues: a recoverable TS queue file 212 and a non-recoverable TS queue file 214. The recoverable TS queue file 212 is an audited file, which means that log records denoting all changes to the recoverable TS queue file 212 are durably stored in a log file in such a way that regardless of when a system failure occurs, the complete state of the recoverable TS queue file 212 can be reconstructed as of time that the last committed transaction that changed the contents of that file completed. The methodologies for recovering audited database tables in Tandem systems are well known to those skilled in the art.

The non-recoverable TS queue file 214 is an unaudited file.

In the preferred embodiment the attributes of TS queues are initially defined by a system administrator, and at that time are defined as being in either the recoverable TS queue file 212 or the non-recoverable TS queue file 214. Each TS queue must have a unique name, and thus when a function call is made to a CICS TS function, it is uniquely mapped to one of the two TS queue files via a TS queue lookup table 215 whose contents are updated each time the system administrator creates a TS queue.

For purposes of the explaining the operation of the TS queue files, in the following discussion we will explain the operation of the recoverable TS queue file 212, which will hereinafter be called "the TS queue file" for simplicity. The operation of the non-recoverable TS queue file 212 is identical, except that its contents are not recoverable in the event of a system failure.

As shown in FIG. 6, each record of the TS queue file indicates the associated queue name, an item number and a sequence number. The queue name identifies the temporary storage queue associated with the record, while the item number and sequence number are used in the primary key for the file for ordering the records. Multiple temporary storage queues are stored in a single TS queue file 212 by using a unique queue name for each temporary storage queue. The primary key for the TS queue file is:

PrimaryKey=QueueName, ItemNo, SeqNo.

Each TS queue 216 stored in the TS queue file 212 has an associated control record 218 that is used to control access to the TS queue. Control records 218 are indicated by a item number of zero. Each control record stores a browse cursor and an indicator of the number of items in the associated temporary storage "queue." The browse cursor is always set equal to the item number of the last queue item to have been read, except when the associated TS queue is empty or no items in the TS queue have been read.

Each data record in a TS queue includes at least a portion of the data for an item stored in the TS queue. In the preferred embodiment, an "item" stored in a TS queue can contain up to 32K bytes of data. However, in the preferred embodiment each record in a table cannot be longer than 4K bytes. To allow the storage of items with more than 4K bytes of data, the preferred embodiment uses a form of "logical record spanning." In particular, the TS queue records include sequence numbers and the first record of each TS queue item includes a "record count" value (shown as "#records" in FIG. 6) that indicates the number of records used to store that item. While in most cases the record count will be equal to one, in some cases the record count will be as high as nine.

There are three function calls associated with TS queues: WriteQ TS, ReadQ TS and DeleteQ TS. The operation of each of these functions is explained next.

Figure 7:
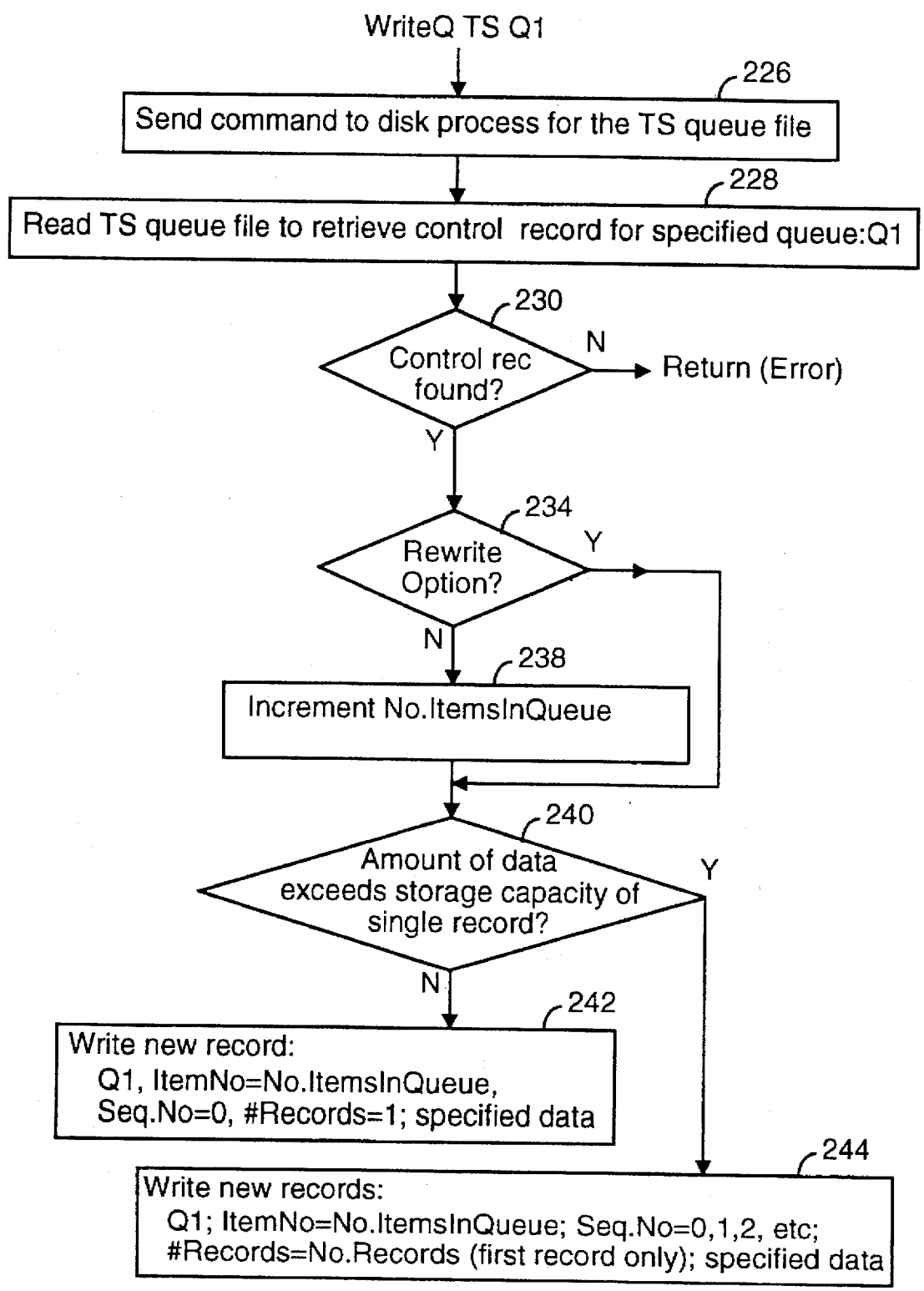
FIG. 7 is a flow chart of the procedure for writing data to a globally accessible temporary storage queue in a preferred embodiment of the present invention.

Referring to FIG. 7, execution of a CICS WriteQ TS function call, for example:

CICS WriteQ TS Q1 data1 is initiated by (A) looking in the TS queue lookup table 215 to determine which of the two TS queue files the specified TS queue (Q1) is stored in, and then (B) sending a command to the disk process 146-2 for the identified TS queue file (step 226) to write one or more records containing the specified data. If the specified queue name (Q1) is not found in the TS queue lookup table 214, or if the disk process is unable to find the control record for the named queue (Q1) is not found (step 230), the function call is aborted, returning an error code to the calling process. The browse cursor is left unchanged by the WriteQ TS function. The new data record or records written to the TS queue file are generally appended to the end of the file.

The TS queue is stored in the same TS queue file (i.e., the one specified by the TS queue lookup table 215) regardless of which server the user application process on which the transaction making the WriteQ TS function call resides. Furthermore, the WriteQ TS function call is the same, regardless of whether the TS queue file is on the same server as the calling user application process or is on another server in the system. Connectivity between the calling user application process and the disk process 146-2 associated with the TS queue file is automatically provided by the operating system and file system, as described above.

Unless the Rewrite option is specified (step 234) by the CICS WriteQ TS function call, the function call causes the "number of items" parameter (No. ItemsInQueue) in the control record 218 to be increased by one (step 238), and for the specified item to be stored in one or more records (depending on its size) with each such record containing the queue name, item number (as specified by the No. ItemsInQueue parameter in the control record) and sequence number associated with that record (steps 240, 242, 244). Thus successive executions of the WriteQ TS function, specifying the same TS queue, cause data to be written to the TS queue file with successive item numbers, unless the Item and Rewrite options are used, as described next.

When the CICS Write TS function call specifies the Rewrite option and a specific item to be written, for example:

CICS WriteQ TS Q1 Item:02 Rewrite data1 then the record (or set of records) for the specified item in the specified TS queue is replaced with a new record (or set of records) for the specified data (steps 236, 240, 242, 244). As noted above, the browse cursor is left unchanged by the WriteQ TS function.

Figure 8:
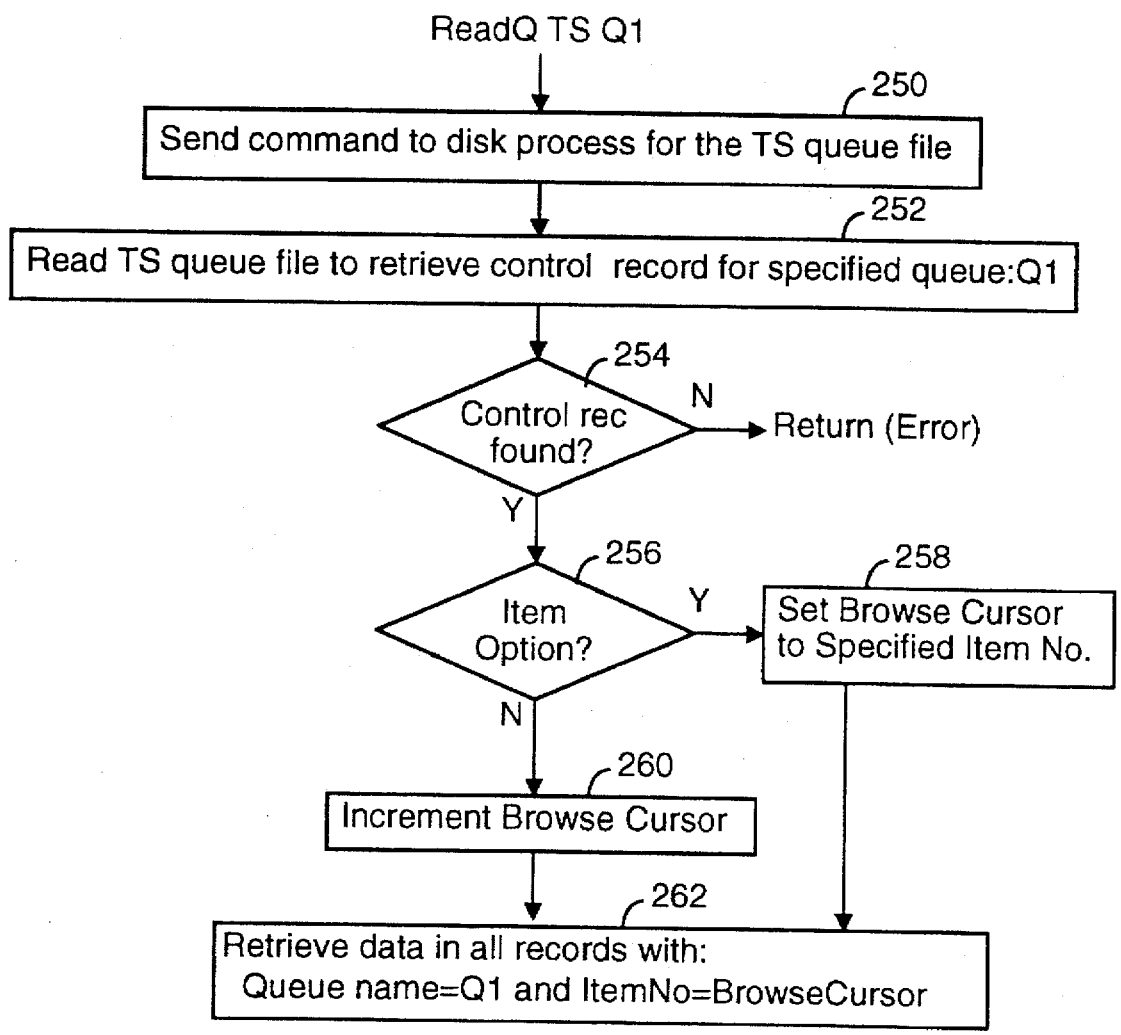
FIG. 8 is a flow chart of the procedure for reading data from a globally accessible temporary storage queue in a preferred embodiment of the present invention.

Referring to FIG. 8, execution of a CICS ReadQ TS function call, for example:

CICS ReadQ TS Q1 Next is initiated by sending a corresponding command to the disk process for the TS queue file (step 250). The disk process reads the TS queue file to attempt to retrieve a control record for the specified TS queue (step 252). If a control record is found (step 254), the disk process increases the browse cursor in the control record for the specified TS queue by one (step 260), and retrieves the data in the record (or set of records) having an item number matching the browse cursor in the specified TS queue (step 262). Successive executions of the ReadQ TS function, specifying the same TS queue, cause data to be retrieved from the TS queue file from records with successive item numbers, unless the Item option is used, as described next.

For reading a specified item (e.g., item 01) in TS queue, the CICS function call is:

CICS ReadQ TS Q1 item:01

This version of the ReadQ TS function call causes the system to reset the browse cursor for the specified TS queue to the specified item number (steps 256, 258) and for the data in the record, or set of records, having an item number matching the browse cursor in the specified TS queue to be retrieved (step 262).

The browse cursor for a specified TS queue can be reset to any specific item number less than or equal to the number of items in the specified TS queue using the ReadQ TS function call with the "item" option as shown above.

All the data records in a TS queue (such as queue Q1) can be deleted by calling the CICS DeleteQ TS function:

CICS DeleteQ TS Q1

Execution of the DeleteQ TS function deletes all temporary data associated with the specified TS queue by deleting the associated data records from the TS queue file. However, the DeleteQ TS function does not cause the control record for the specified TS queue to be deleted. Rather, the contents of the control record are reset to indicate (A) an item count (No. ItemsInQueue) of zero, and (B) a browse cursor value of zero.

Since the TS queue files 212 and 214 are globally accessible, different user application processes can write and read the same temporary storage queue, thereby enabling the transfer of information from one transaction to another (and thus from one user application process to another), even when those transactions are being executed by user application processes that reside on different servers within the system.

In summary, when using the present invention, applications executed by user application processes on different servers that share no resources can exchange data through globally accessible temporary storage queues.

Furthermore, the global accessibility of TS queues, as well as the global accessibility of the Enq File 202 and the Tx Start File 170, provide accessibility by any one transaction to other transactions being executed by user application processes in different server classes, and thus with different attributes, than the user application process executing that one transaction. The ability of systems using the present invention to share information and to coordinate activities between processes having different attributes can be valuable, and is not supported by customer information control systems in which transactions that need to share context information must be executed in the same address space.

Alternate Embodiments and Extensions

In an alternate embodiment of the invention, new TS queues are created and deleted dynamically, not by the system administrator. In particular, the first time a CICS WriteQ TS command is performed on a specified TS queue name, a new TS queue is generated by creating a record in the TS queue lookup table 215 and a control record in a specified one of the two TS queue files. The CICS WriteQ TS function call is modified in this alternate embodiment to include a new "non-recoverable" option to indicate the TS queue file in which the new TS queue is to be created. If the "non-recoverable" option is specified in the WriteQ TS function call, the new TS queue is generated in the non-recoverable TS queue file 214; otherwise the new TS queue is generated in the recoverable TS queue file 212. In this alternate embodiment, the DeleteQ TS function deletes the named TS queue entirely, including the TS queue's control record, instead of just resetting the contents of the control record back to its starting values.

In alternate embodiments of the invention, items of greater than 32K bytes could be stored in a temporary storage (TS) queue. The 32K byte limit is an artificial limit associated with the maximum size of other records in the preferred embodiment. Thus, in other embodiments a larger (or smaller) size limit on TS queue items could be used without changing the basic mechanisms of the temporary storage queues, as described above.

Figure 9:
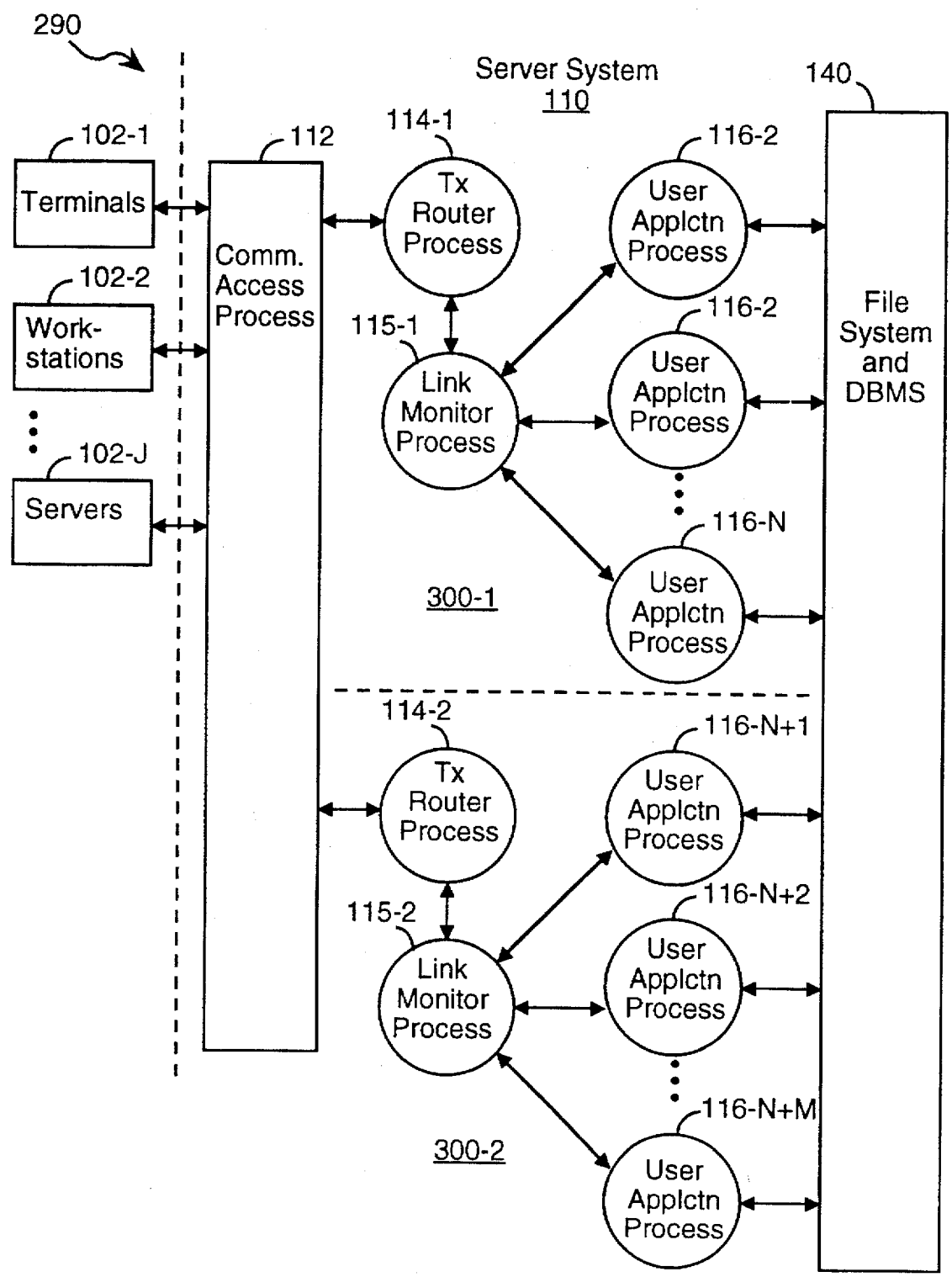
FIG. 9 is a block diagram of a customer information control system having a plurality of server clusters.

Referring to FIG. 9, in an extension of the scaleability of the present invention, when the transaction load on the customer information control system grows so large that the transaction router process or the link manager process become a bottleneck due to limitations in their ability to handle transaction requests, the system 290 shown in FIG. 1 can be extended by providing two or more "server clusters" 300, each of which has its own transaction router process 114, link manager process 115, and user application processes 116. Each service cluster 300 operates on a distinct set of servers 120. Nevertheless, all the servers in all the clusters are linked together via a communications network 129 (see FIG. 2), which may include both high speed data busses as well as wide area network (WAN) connections. As shown in FIG. 9, the servers share a common file system and DBMS 140, allowing the global sharing of context information in accordance with the present invention. In a preferred embodiment, the clusters also share use of a communication access process 112, although multiple instances of the communication access process 112 could also be used.

In the preferred embodiment of the multiple cluster system 290, a single transaction start process (see FIG. 4) is used to handle starts in all the clusters 300 so that the system can guarantee that transaction requests with ordered start time values are started in their designated order.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A distributed computer system, comprising:

a plurality of end user terminals;

a plurality of server computers having identical customer information control procedure functions where the plurality of server computers share no resources with each other than data links interconnecting the plurality of server computers and information accessed via the data links; said server computers including a multiplicity of user application processes distributed over said plurality of server computers;

a single temporary storage file, stored on a first one of said server computers, for temporarily storing queues of temporary storage (TS) data records;

each said user application process including means, responsive to execution of a WriteQ TS instruction specifying data to be stored in a specified temporary storage queue, for generating and storing at least one TS data record in said temporary storage file representing said specified data, said at least one TS data record having a primary key indicating said at least one TS data record's position in said specified temporary storage queue;

each said user application process including means, responsive to execution of a ReadQ TS instruction specifying a temporary storage queue from which data is to be retrieved, for reading at least one TS data record from said temporary storage file whose primary key indicates said at least one TS data record is in said specified temporary storage queue;

wherein each said TS data record is stored in said temporary storage file on said first one of said server computers regardless of which one of said server computers executes said WriteQ TS instruction.

2. The system of claim 1, further including a file system, located on at least one of said server computers, for storing files and database tables and for providing access to said stored files and database tables to all of said user application processes without regard to which server computer each such user application processes is executed on.

3. A distributed computer system, comprising:

a plurality of end user terminals;

a plurality of server computers having identical customer information control procedure functions where the plurality of server computers share no resources with each other than data links interconnecting the plurality of server computers and information accessed via the data links; said server computers including a multiplicity of user application processes distributed over said plurality of server computers;

a single temporary storage file, stored on any one of said server computers, for temporarily storing queues of temporary storage (TS) data records;

a first one of said user application process on a first one of said server computers including means, responsive to execution of a WriteQ TS instruction specifying data to be stored in a first specified temporary storage queue, for generating and storing at least one TS data record in said temporary storage file representing said specified data, said at least one TS data record having a primary key indicating said at least one TS data record's position in said first specified temporary storage queue;

a second one of said user application processes on a second one of said server computer including means, responsive to execution of a ReadQ TS instruction specifying said first specified temporary storage queue from which data is to be retrieved, for reading at least one TS data record from said temporary storage file whose primary key indicates said at least one TS data record is in said first specified temporary storage queue;

wherein said second user application process is distinct from said first user application process and said second server computer is distinct from said first server computer.

4. A method of operating a distributed computer system having a plurality of end user terminals and a plurality of server computers having identical customer information control procedure functions where the plurality of server computers share no resources with each other than data links interconnecting the plurality of server computers and information accessed via the data links; said server computers including a multiplicity of user application processes distributed over said plurality of server computers; the steps of the method comprising:

storing a single temporary storage file on a first one of said server computers, said temporary storage file for temporarily storing queues of temporary storage (TS) data records;

when any of said user application processes executes a WriteQ TS instruction specifying data to be stored in a specified temporary storage queue, generating and storing at least one TS data record in said temporary storage file representing said specified data, said at least one TS data record having a primary key indicating said at least one TS data record's position in said specified temporary storage queue;

when any of said user application processes executes a ReadQ TS instruction specifying a temporary storage queue from which data is to be retrieved, reading at least one TS data record from said temporary storage file whose primary key indicates said at least one TS data record is in said specified temporary storage queue;

wherein said TS data record is stored in said temporary storage file on said first one of said server computers regardless of which one of said server computers executes said WriteQ TS instruction.

5. The method of claim 4, further including:

providing a file system, located on at least one of said server computers, for storing files and database tables and for providing access to said stored files and database tables to all of said user application processes without regard to which server computer each such user application processes is executed on.

6. A method of operating a distributed computer system having a plurality of end user terminals and a plurality of server computers having identical customer information control procedure functions where the plurality of server computers share no resources with each other than data links interconnecting the plurality of server computers and information accessed via the data links; said server computers including a multiplicity of user application processes distributed over said plurality of server computers; the steps of the method comprising:

storing a single temporary storage file on any one of said server computers, said temporary storage file for temporarily storing queues of temporary storage (TS) data records;

when a first one of said user application processes on a first one of said server computers executes a WriteQ TS instruction specifying data to be stored in a first specified temporary storage queue, generating and storing at least one TS data record in said temporary storage file representing said specified data, said at least one TS data record having a primary key indicating said at least one TS data record's position in said first specified temporary storage queue;

when a second one of said user application processes on a second one of said server computers executes a ReadQ TS instruction specifying said first temporary storage queue from which data is to be retrieved, reading at least one TS data record from said temporary storage file whose primary key indicates said at least one TS data record is in said first specified temporary storage queue;

wherein said second user application process is distinct from said first user application process and said second server computer is distinct from said first server computer.

* * * * *